(12) United States Patent
Taylor et al.

(10) Patent No.: US 6,493,960 B2
(45) Date of Patent: Dec. 17, 2002

(54) PARYLENE COATED DESICCANT SHEET WITH ACTIVATION STRIP

(75) Inventors: Jeffrey B. Taylor, Wyoming, MN (US); John E. Hansen, Coon Rapids, MN (US)

(73) Assignee: Cardiac Pacemakers, Inc., St. Paul, MN (US)

(*) Notice: Subject to any disclaimer, the term of this patent is extended or adjusted under 35 U.S.C. 154(b) by 188 days.

(21) Appl. No.: 09/730,347

(22) Filed: Dec. 5, 2000

(65) Prior Publication Data

US 2002/0066203 A1 Jun. 6, 2002

(51) Int. Cl.[7] .................................................. F26B 5/16
(52) U.S. Cl. .............................. 34/80; 34/416; 34/307; 34/310
(58) Field of Search ..................... 252/194; 502/527.12, 502/400; 428/41.7, 41.8, 41.9, 42.2, 42.3; 34/416, 472, 80, 307, 310, 330, 335, 336; 206/204; 436/169

(56) References Cited

U.S. PATENT DOCUMENTS

| | | | | |
|---|---|---|---|---|
| 2,210,862 A | * | 8/1940 | Tronstad | 34/1 |
| 4,588,505 A | * | 5/1986 | Walley et al. | 210/502.1 |
| 4,645,698 A | * | 2/1987 | Matsubara | 428/68 |
| 4,730,726 A | * | 3/1988 | Holzwarth | 206/204 |
| 4,770,320 A | * | 9/1988 | Miles et al. | 221/33 |
| 4,802,574 A | * | 2/1989 | Akiba | 206/204 |
| 5,075,174 A | | 12/1991 | Pyle | 428/447 |
| 5,108,784 A | * | 4/1992 | Anderson et al. | 427/96 |
| 5,143,763 A | * | 9/1992 | Yamada et al. | 428/36.2 |
| 5,150,787 A | * | 9/1992 | Bird et al. | 206/329 |
| 5,496,397 A | | 3/1996 | Fischer et al. | 96/154 |
| 5,536,317 A | | 7/1996 | Crain et al. | 118/664 |
| 5,562,715 A | | 10/1996 | Czura et al. | 607/36 |
| 5,591,379 A | * | 1/1997 | Shores | 252/194 |
| 5,786,062 A | | 7/1998 | Callahan, Jr. et al. | 428/100 |
| 5,888,925 A | | 3/1999 | Smith et al. | 502/400 |
| 5,939,161 A | | 8/1999 | Callahan, Jr. et al. | 428/40.1 |
| 5,962,333 A | * | 10/1999 | Incorvia et al. | 436/169 |
| 6,103,141 A | * | 8/2000 | Incorvia et al. | 252/194 |
| 6,378,224 B1 | * | 4/2002 | Qualkinbush et al. | 34/80 |
| 2002/0023850 A1 | * | 2/2002 | Dean | 206/204 |

* cited by examiner

Primary Examiner—Ira S. Lazarus
Assistant Examiner—K. B. Rinehart
(74) Attorney, Agent, or Firm—Thomas J. Nikolai; Nikolai & Mersereau, P.A.

(57) ABSTRACT

An apparatus for drying the air inside of hermetically sealed electronic devices. The apparatus includes a desiccant part and an activation piece that is attached to the desiccant part. The desiccant part and activation piece are attached together and then covered, except for the portions where the two pieces are attached, with a polymer that has a low moisture vapor transmission rate, such as parylene. The apparatus may be added into an electronic device during assembly. The desiccant, or drying agent, is not activated, by removal of the activation piece, until prior to closure of the hermetically sealed electronic device.

26 Claims, 3 Drawing Sheets

PARYLENE COATED DESICCANT SHEET WITH ACTIVATION STRIP

FIELD OF THE INVENTION

This invention relates generally to hermetically sealed electronic devices and, more particularly, to an apparatus for drying the inside of such devices.

BACKGROUND OF THE INVENTION

Electronic assemblies for use in a variety of harsh environments, such as in space, marine applications, or the human body, are sealed from the outside conditions by use of gas-tight (hermetically sealed) containers. Such containers, while sealing out external dust, air or moisture, also trap in whatever is inside the devices. Water vapor is one of the things that are trapped inside such devices. Since any water vapor that is present inside of an electronic enclosure is a potential contributor to corrosion and circuit shorting, it is desirable to somehow remove the water vapor from the air inside the device after it is sealed.

The moisture in the air inside of a sealed electronic device can be removed from the air by including a desiccant inside of the device. A desiccant is usually placed inside electronic devices immediately prior to closure of the devices. The desiccant removes the moisture from the air inside the device by trapping or absorbing it. A dry desiccant in some form is placed inside an electronic device as one of the last steps prior to closure of the device. The step of adding the desiccant to the device is usually done in a "dry box," or "weld glove box," and, that way, the desiccant is kept basically dry prior to placement in the device. If a desiccant was added to a device earlier and/or allowed to be exposed to the air for some time while the electronic device was being assembled, the desiccant would absorb an appreciable amount of moisture from the air and would thereby be ineffective in absorbing moisture from the air inside of the electronic device once it is sealed shut.

The fact that the desiccant must be added as one of the last steps in assembly of an electronic device places limits on the design and form of the desiccant and also on the design of the electronic device itself. Currently, the design of both must allow the desiccant to be easily added to a near completely assembled electronic device. In addition, the need for use of a "dry box" or "weld glove box" in the assembly of electronic devices obviously places limits on where the assembly of the device may take place.

A need, therefore, exists for an apparatus that allows a desiccant to be incorporated into an electronic device well prior to closure of the device without the desiccant adsorbing an appreciable amount of moisture from the air. A need also exists for a way to control when the desiccant will begin to absorb moisture. The present invention meets these needs, and more. The present invention includes a coating over a desiccant that is an effective barrier to moisture for a definable period of time. The present invention also provides a way to activate the desiccant at a specific time to begin absorbing moisture. The present inventive apparatus may be made in different shapes, sizes and forms that allow for different designs of the electronic devices themselves. The present invention also meets other needs that will become apparent from a review of the description of the present invention.

There is prior art that discloses coating desiccants with a surface treatment to limit adsorption by the desiccant. However, the prior art does not include any kind of activation strip or mechanism to begin the absorption at a certain time.

SUMMARY OF THE INVENTION

In its simplest embodiment, the present invention is an apparatus for drying the air inside of a hermetically sealed electronic device that comprises a desiccant part, an activation piece that is attached to said desiccant part, and a coating of a material with a low moisture vapor transmission rate that coats said activation piece and said desiccant part except where said activation piece and said desiccant part are attached.

The advantages of the present invention will become readily apparent to those skilled in the art from a review of the following detailed description of the preferred embodiment especially when considered in conjunction with the claims and accompanying drawings in which like numerals in the several views refer to corresponding parts.

DETAILED DESCRIPTION

Figure 1:
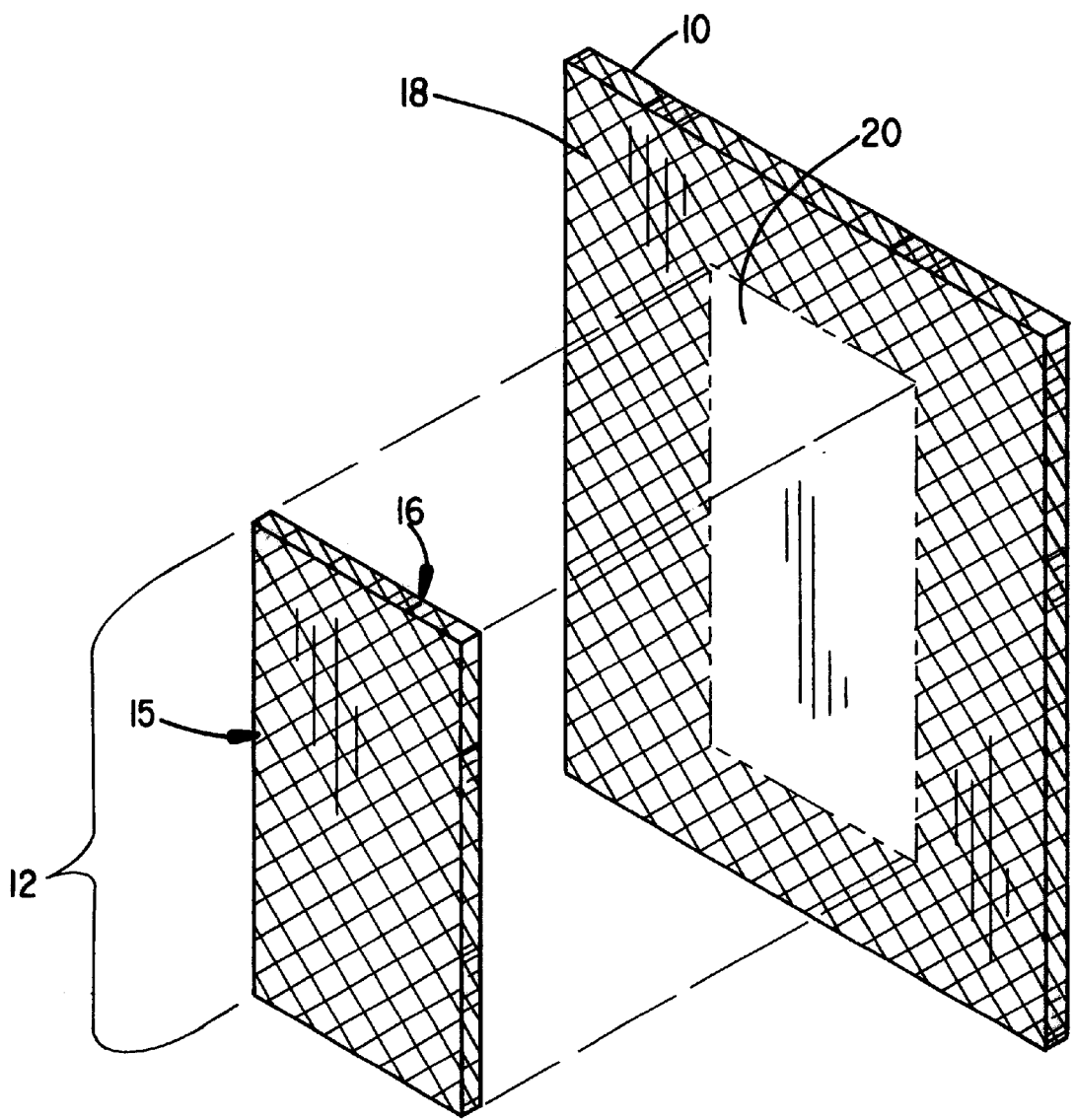
FIG. 1 is an exploded view of one preferred embodiment of the present invention.

FIG. 1 shows an exploded view of one embodiment of the present invention. In this embodiment, the desiccant part 10 of the present invention comprises desiccant impregnated in a carrier component. The desiccant part 10 can also be described as a means for drying the air inside of a hermetically sealed electronic device. The desiccant part 10 is in the shape of a square or rectangular sheet. However, the desiccant part can be in many different shapes and sizes and is not limited to the shape and size shown in FIG. 1. The desiccant in the preferred embodiment shown in FIG. 1 is molecular sieve, and the carrier component is silicone. However, other possible desiccants or desiccants and carrier compounds may be used.

The preferred embodiment shown in FIG. 1 includes an activation strip or piece 12, which is removably attached to the desiccant part 10. The activation piece is also described as a means for activating said drying means. The activation piece 12 is in a rectangular shape, however, it is not limited to that shape and can be in many different shapes and sizes. The activation piece 12 in the preferred embodiment in FIG. 1 has opposite first and second major side surfaces 15, 16. The activation piece 12 is removably attached to the desiccant part 10, and may be removably attached through the use of an adhesive or other material on one major side surface 16, which is the major side surface that is attached to the desiccant part 10. The material or adhesive could be any kind of material or adhesive that will allow the activation strip 12 to be attached to the desiccant part 10 but that will also allow the activation strip 12 to be later removed from the desiccant part 10. A preferred material or adhesive would be one that does not leave behind a significant amount of residue on the desiccant part 10 when the activation piece 12 is removed. A preferred type of adhesive is a pressure sensitive adhesive, although other types may be used.

As shown in the preferred embodiment shown in FIG. 1, both the activation piece 12 and the desiccant part 10 are attached and are coated with a coating 18 of parylene. The coating 18 covers the desiccant part 10 and the activation piece 12, except the portions of the activation piece 12 and desiccant part 10 where the activation piece 12 and desiccant part 10 are attached. Parylene is the preferred coating 18, however, other materials may be used. The material used to coat the desiccant part 10 and activation piece 12, except where the activation piece 12 and desiccant part 10 are attached, should have a low moisture vapor transmission rate. The coating 18 may be a polymer. Basically, the coating is a means for preventing moisture vapor transmission to said drying means prior to activation of said drying means, which coats said drying means and said activating means except the portions of said drying means and said activating means where said drying means and said activating means are attached.

FIG. 1 also shows an area 20 of the desiccant part 10 that is not covered by the parylene or other material used for the coating 18 when the activation piece 12 is removed. As a result of the activation piece 12 being removed, the area 20 is exposed to the air. This allows the desiccant in the desiccant part 10 to absorb moisture much more quickly and easily than through the parylene, or other material, coating 18. In the assembly of electronic devices for which the present invention is used, the activation piece 12 should not be removed from the desiccant part 10, as shown, until some time right before the electronic device is closed and hermetically sealed. The desiccant in the desiccant part 10 is then able to absorb the required or calculated amount of moisture from the air inside of the hermetically sealed electronic device.

A desiccant is a hydrating agent that attracts moisture from the atmosphere. It adsorbs and holds particles of water to itself. There are many different kinds of desiccants. They include naturally occurring, modified, and synthetic aluminosilicates, aluminas, silica gels, molecular sieves or zeolites, activated carbon, and activated alumina. It is possible that any of these desiccants, or other desiccants, could be used in the present invention.

The preferred desiccant for the present invention is molecular sieve. The molecular sieve is a network of uniform pores and empty cavities. Molecular sieve is derived from sodium potassium or calcium alumina silicate. It is a non-hazardous material. Molecular sieve is the desiccant of choice for most demanding and unique applications. Molecular sieve is the most aggressive and expensive of the primary desiccants.

The desiccant part 10, in the preferred embodiment, and as shown in FIG. 1, is made by using a process that is well known. First, desiccant powder is removed from a can and spread out in a thin layer. Second, the desiccant powder is exposed in a humidity chamber for several hours to allow the desiccant powder to become fully saturated. Next, the desiccant is then removed from the humidity chamber and the saturated desiccant powder is then mixed with liquid silicone rubber in a pot. The mixture in the preferred embodiment is 45% desiccant and 55% silicone by weight, however it may be a different ratio. The mixture is then poured into an injection molding machine and injected into a sheet mold, for example, and cured. The sheet is then removed from the mold and die-cut to correct the shape of the part. The part is then placed in a vacuum oven and dried out, which removes virtually all of the water. The part is then sealed in an airtight container.

There are other methods that may be used to make the desiccant part in the present invention. In addition, the desiccant part may be made in different shapes, forms and sizes. The flexibility in the shape, form and size of the desiccant part will enable the electronic devices themselves to be made in different shapes and sizes.

The feature of the present invention that allows it to be made into different shapes and sizes is especially important in the design and manufacture of implantable cardiac rhythm management devices. It is desirable to make such devices smaller than previous devices. The flexibility that the present invention allows for the form, size and shape of the drying apparatus allows implantable cardiac rhythm management devices to be made smaller. For example, they may be made smaller because the drying apparatus could be fit into an already existing space inside of the devices. One such example of an embodiment of the present invention is that the apparatus is in the form of the liner of the implantable cardiac rhythm management device.

In the present invention, the activation piece 12 may be added to the desiccant part 10 before or after the desiccant part 10 has been dried out. If it is added before the drying step, then the activation piece 12 must be able to withstand, for example, the 260-degree drying temperature necessary to dry the desiccant part 10.

Parylene is the generic name for members of a unique family of thermoplastic polymers that are formed on a surface exposed to a rarified gas in a vacuum. The resulting linear crystalline polymer coating possesses superior barrier properties per unit thickness, has extreme chemical inertness, and is free from pinholes. There are three commonly used forms of parylene dimers, which are Parylene N, Parylene C and Parylene D. Each has unique properties that suit them for particular types of coating applications. In particular, Parylene C is superior to almost all other polymeric material for having a low moisture vapor transmission rate.

Parylene coatings are obtained by means of a well-known vapor deposition process in which the dimer is vaporized, pyrolized, i.e. cleaved into a monomer vapor form, and fed into a deposition chamber wherein the monomer molecules deposit and polymerize onto a substrate disposed within the deposition chamber. Due to their ability to provide thin films and conform to substrates of varied geometric shapes, parylene polymers are ideally suited for use as a conformal external coating in a wide variety of fields, such as for example, in the electronics, automotive and medical industries.

Figure 2:
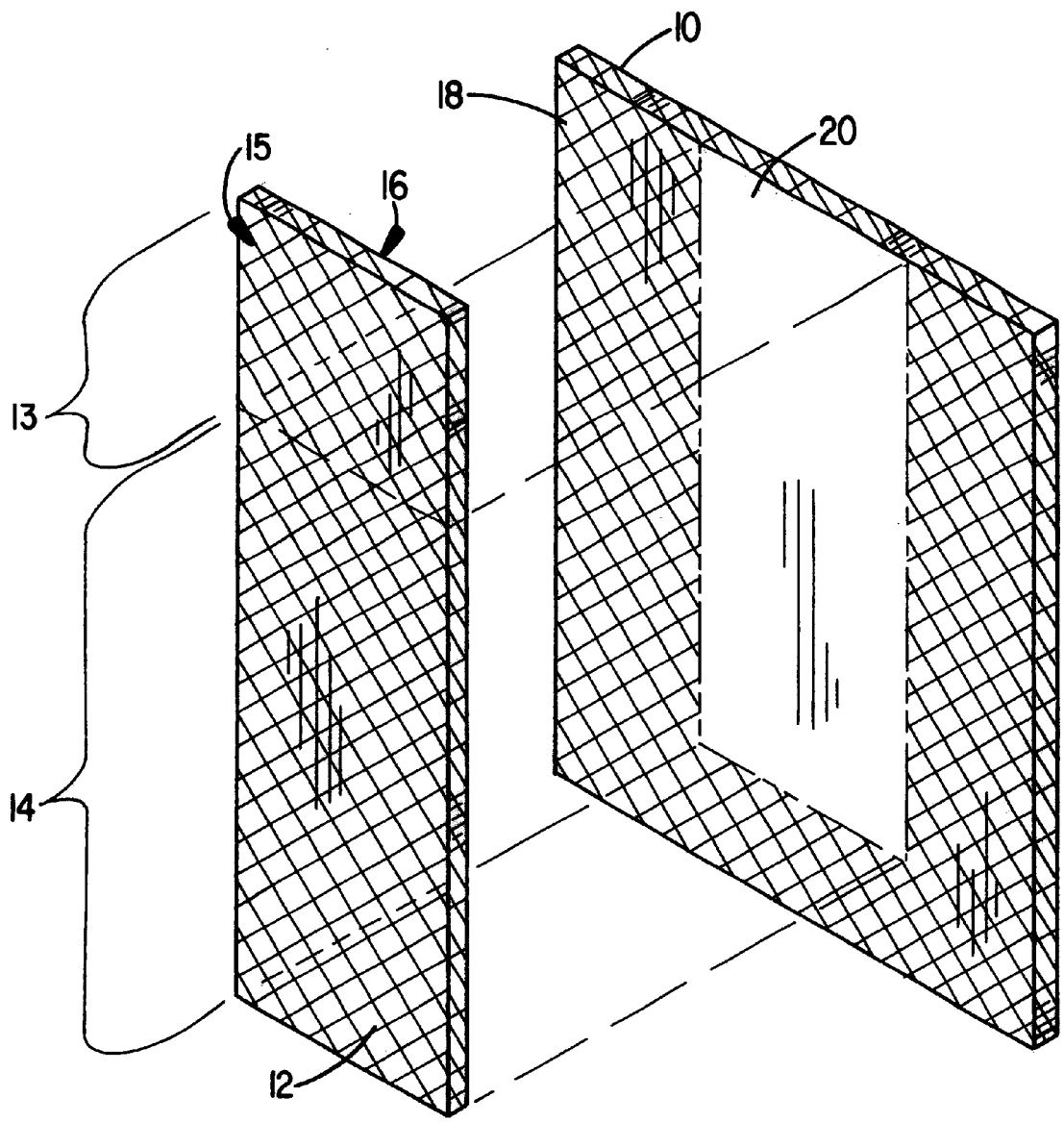
FIG. 2 is an exploded view of a second preferred embodiment of the present invention.
Figure 3:
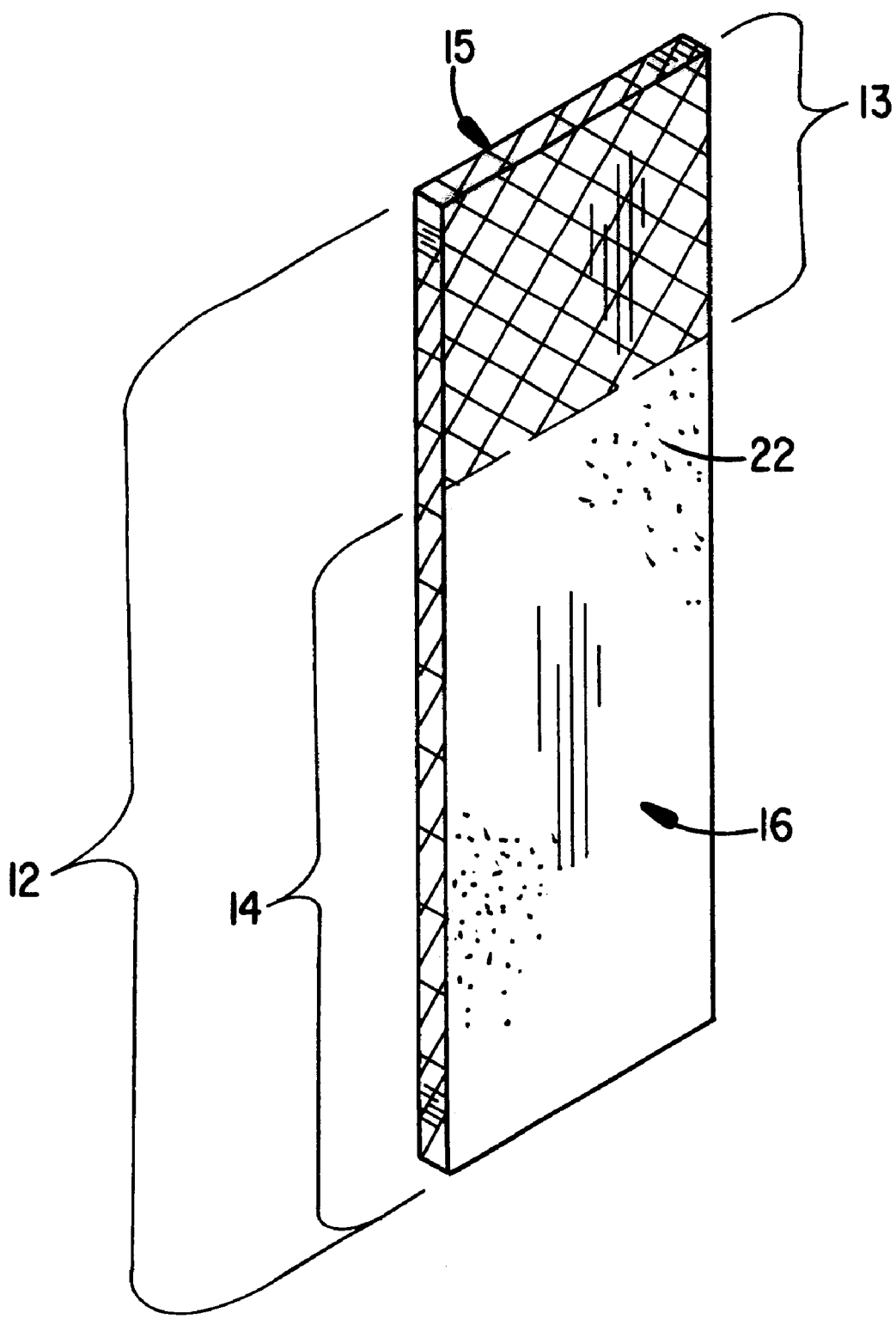
FIG. 3 is a perspective view of the activation piece of the second preferred embodiment, which shows the reverse side of the activation piece.

There is a second preferred embodiment of the present invention, as shown the exploded view in FIG. 2, that will result in uniform coverage of parylene, or other coating material 18, on the desiccant piece 10 that is free from any holes. As can be seen in FIGS. 2 and 3, the activation piece 12 is a flexible sheet comprising a layer of material having opposite top and bottom major side surfaces, 15 and 16 respectively, and first and second opposite end portions, 13 and 14 respectively, such as that claimed in U.S. Pat. No. 4,770,320 issued to Miles et al. The activation piece 12, as in the first preferred embodiment, is removably attached to the desiccant part 10. There may be a coating of adhesive 22 on the second opposite side surface 16 of the second end portion 14, which attaches the activation piece 12 to the desiccant part 10. The first end portion 13 is free of adhesive on both of said side surfaces 15, 16.

In the second preferred embodiment shown in FIG. 2, the combination of the desiccant part 10 and the activation piece 12 are coated with parylene, 18, or some other material that has a low moisture vapor transmission rate. When the combination is being coated with parylene, or another material, in the deposition chamber, as described above, it must be held by something so that it may be completely coated. The preferred embodiment shown in FIG. 2 allows the combination of the desiccant part 10 and the activation piece 12 to be held by the end portion 13 of the activation piece 12. This results in no areas of the desiccant part 10 being left uncovered by the coating 18. Therefore, this provides the apparatus with a means for securing said drying means and said activating means while said drying means and said activating means are being coated with said means for preventing moisture vapor transmission. The securing means may be a portion of said activating means that is not attached to said drying means.

The end portion 13 also provides a place for a person or machine to grab and remove the activation piece 12 from the desiccant part 10. Therefore, this also provides the apparatus with a means for removing said activation piece from said drying means. The removing means may be a portion of said activating means that is not attached to said drying means.

FIG. 2 shows the area 20 that is exposed to the air when the activation piece 12 is removed in the second preferred embodiment.

It should be noted that the preferred embodiment shown in FIG. 2 is just one example of the present invention. The desiccant part 10 and activation piece 12 can be in different shapes and sizes from those illustrated. In addition, the end portion 13 of the activation piece 12 that can be used to secure the desiccant part 10 and activation piece 12 combination while it is being coated, does not necessarily have to extend beyond the desiccant part 10 as shown. It could, for example, extend perpendicular to the activation piece 12 and desiccant part 10 combination. In addition, the present invention is not limited to the proportions of the portions 13, 14 of the activation piece 12 shown in the present application. There are many different examples that are possible, and the present invention is not limited to those shown or described in the specification.

Although the present invention may be used in all kinds of hermetically sealed electronic devices, it is particularly useful for the pulse generators of implantable cardiac rhythm management devices. The claimed apparatus allows an electronic device, such as a pulse generator, to be assembled in a humid environment. All of the components of the pulse generator, including the desiccant part, could be assembled in any order. The desiccant part would not have to be put into the pulse generator in a weld glove box or dry box, which is commonly used, and would not have to be done just prior to closure of the device. The desiccant part of the present invention could be placed in the pulse generator of the implantable cardiac rhythm management device, and the desiccant could then be activated prior to closure of the device by removing the activation piece 12.

The advantage of the present invention is that it allows for the design of a drying apparatus that can be an integral part of the electronic device assembly, yet that doesn't need special handling or storage conditions. The space inside of devices, such as pulse generators, is limited and, thus, it is highly preferable that the drying apparatus be easily formed into a shape that can easily conform to the inside of the sealed device.

This invention has been described herein in considerable detail in order to comply with the patent statutes and to provide those skilled in the art with the information needed to apply the novel principles and to make and use such a device. However, it is to be understood that the invention can be carried out by specifically different equipment and devices, and that various modifications, both as to the components and structure, can be accomplished without departing from the scope of the invention itself.

What is claimed is:

1. An apparatus for drying the air inside of a hermetically sealed electronic device comprising:
    a. a desiccant part;
    b. an activation piece that is attached to said desiccant part;
    c. a coating of a material with a low moisture vapor transmission rate that coats said activation piece and said desiccant part except the portions of said activation piece and said desiccant part where said activation piece and said desiccant part are attached.

2. The apparatus as claimed in claim 1 wherein said desiccant part comprises a desiccant.

3. The apparatus as claimed in claim 1 wherein said desiccant part comprises a carrier component that is impregnated with a desiccant.

4. The apparatus as claimed in claim 3 wherein said carrier component is silicone and said desiccant is molecular sieve.

5. The apparatus as claimed in claim 1 wherein said desiccant part is in a form and shape such that said apparatus can be incorporated into said electronic device.

6. The apparatus as claimed in claim 1 wherein said activation piece is removably attached to said desiccant part.

7. The apparatus as claimed in claim 6 wherein said activation piece includes a means for removing said activation piece from said desiccant part.

8. The apparatus as claimed in claim 7 wherein said removing means is a portion of said activation piece that is not attached to said desiccant part.

9. The apparatus as claimed in claim 1 wherein said activation piece includes a means for securing said desiccant part and said activation piece while said desiccant part and said activation piece are being coated with said coating.

10. The apparatus as claimed in claim 9 wherein said securing means is a portion of said activation piece that is not attached to said desiccant part.

11. The apparatus as claimed in claim 1 wherein said activation piece comprises a flexible sheet having opposite first and second major side surfaces and having a layer of adhesive along one of the major side surfaces that attaches to said desiccant part.

12. The apparatus as claimed in claim 1 wherein said activation piece comprises a flexible sheet having first and second major side surfaces and having first and second opposite end portions and having adhesive on a second end portion of one of said major side surfaces while being free of adhesive on both of said major side surfaces along a first end portion thereof.

13. The apparatus as claimed in claim 1 wherein said material is a polymer.

14. The apparatus as claimed in claim 13 wherein said polymer is parylene.

15. The apparatus as claimed in claim 1 wherein said electronic device is an implantable cardiac rhythm management device.

16. An apparatus for drying the air inside of a hermetically sealed electronic device comprising:
    a. means for drying the air inside of said hermetically sealed electronic device;
    b. means for activating said drying means that is attached to said drying means;
    c. means for preventing moisture vapor transmission to said drying means prior to activating said drying means, that coats said drying means and said activating means except the portions of said drying means and said activating means where said drying means and said activating means are attached.

17. The apparatus in claim 16 wherein said drying means is a desiccant.

18. The apparatus in claim 16 wherein said activating means is removably attached to said drying means.

19. The apparatus as claimed in claim 16 and further comprising a means for removing said activating means from said drying means.

20. The apparatus as claimed in claim 19 wherein said removing means is a portion of said activating means that is not attached to said drying means.

21. The apparatus as claimed in claim 16 and further comprising a means for securing said drying means and said activating means while said drying means and said activating means are being coated with said means for preventing moisture vapor transmission.

22. The apparatus as claimed in claim 21 wherein said securing means is a portion of said activating means that is not attached to said drying means.

23. The apparatus in claim 16 wherein said means for preventing moisture vapor transmission is a coating of a material with a low moisture vapor transmission rate that coats said activating means and said drying means except the portions of said activating means and said drying means where said activating means and said drying means are attached.

24. The apparatus as claimed in claim 23 wherein said material is a polymers.

25. The apparatus as claimed in claim 24 wherein said polymer is parylene.

26. The apparatus as claimed in claim 16 wherein said electronic device is an implantable cardiac rhythm management device.

* * * * *